United States Patent [19]

Born

[11] Patent Number: 4,607,189

[45] Date of Patent: Aug. 19, 1986

[54] CATHODE RAY TUBE WITH GLASS-TO-METAL SEAL USING SILVER CHLORIDE CEMENT

[75] Inventor: Peter J. Born, Ledbury, England

[73] Assignee: The Secretary of State for Defence in Her Britannic Majesty's Government of the United Kingdom of Great Britain and Northern Ireland, London, England

[21] Appl. No.: 582,602

[22] Filed: Feb. 22, 1984

[30] Foreign Application Priority Data

Feb. 25, 1983 [GB] United Kingdom ................. 8305366

[51] Int. Cl.[4] ....................... H01J 29/86; B23K 31/00; C03B 23/20; C03C 27/04

[52] U.S. Cl. ............................. 313/477 R; 220/2.1 A; 501/86; 228/122; 65/154

[58] Field of Search .................... 313/390, 385, 477 R, 313/480, 482, 467–469; 220/2.3 A, 2.1 R, 2.3 R; 501/86; 252/301.5; 65/301.4 R, 43, 154; 228/121, 122, 903

[56] References Cited

U.S. PATENT DOCUMENTS 254,312 2/1882 Heaton et al. ............... 252/301.4 R
2,203,682 6/1940 Foulke .............................. 252/301.5
2,330,171 9/1943 Rosenthal ..................... 252/301.4 R
2,915,153 12/1959 Hitchcock ............................ 220/2.3
3,766,634 10/1973 Babcock et al. ................ 361/411 X
3,994,430 11/1976 Cusano et al. .................. 228/903 X
4,019,080 4/1977 Besson ............................ 313/477 R

FOREIGN PATENT DOCUMENTS 900582 7/1962 United Kingdom ................ 313/467

*Primary Examiner*—Palmer C. DeMeo
*Assistant Examiner*—Sandra L. O'Shea
*Attorney, Agent, or Firm*—Stevens, Davis, Miller & Mosher

[57] ABSTRACT

A cathode ray tube (1) having a body (3) of glass material and a faceplate (5) of solid phosphor material. The body (3) and faceplate (5) are sealed together by a sealant (15) of malleable halide material—for example silver chloride, or lead-silver chloride eutectic. Sealing is effected by inserting a ring (15) of sealant material between abutting surfaces of the body (3) and the faceplate (5), heating in vacuum to above the melting point of the sealant, and cooling to allow the sealant to solidify. The faceplate (5) may be of single crystal material—e.g. zinc tungstate or calcium borate, or may be of hot pressed solid material—e.g. zinc yttrium silicate.

12 Claims, 3 Drawing Figures

CATHODE RAY TUBE WITH GLASS-TO-METAL SEAL USING SILVER CHLORIDE CEMENT

TECHNICAL FIELD

The present invention is concerned with the structure and manufacture of a cathode ray tube, and in particular a cathode ray tube having a face plate of solid phosphor material.

Cathode ray tubes have application in photo-typesetting and in tele-cinematography. In both these applications very high definition is desirable.

Cathode ray tubes also have application in projection display and are required for cockpit head-up display. In this application the tubes must support a high intensity, energetic, electron beam and provide high luminance. The phosphor must exhibit resistance to "burn" under electron bombardment.

BACKGROUND ART

In a conventional cathode ray tube, particulate cathodoluminescent phosphor material is provided as a deposit on the internal face-plate surface of an evacuated lead-glass envelope. The rear surface of the phosphor deposit is coated with conductive material, which latter provides the tube anode. When the phosphor is bombarded by electrons, light is emitted. This light is scattered, however, by neighbouring phosphor particles. For high definition applications, fine particle phosphors are used. The ultimate definition, however, is limited by particle-scattering, and the tubes are far from the ideal required for photo-typesetting and tele-cine applications. Furthermore, under high intensity bombardment, phosphor material can become depleted, and the glass can melt, reform, and phosphor can become embedded in the glass at the high localised temperatures that result from electron absorbtion, ie under extreme screen loadings "burning" of the lead glass tube faceplate limits the useful life of tubes intended for high intensity application.

For at least a decade now, cathode ray tube design has been under scrutiny, with a view to eliminating the glass face-plate part of the tube and replacing it with a face-plate of solid phosphor material. A major problem has been the provision of an effective vacuum tight seal between the solid face-plate and lead-glass envelope. In one instance recently reported (Appl Phys Lett Vol 37 No5 pp 471–2, 1980 ) this problem has been avoided by using tube material other than lead-glass. The high intensity projection television tube, described therein, comprises a face-plate of yttrium aluminium garnet (YAG) single crystal and a tube body of high density sintered alumina. The face-plate is sealed to the tube body by thermocompression bonding using aluminium as the sealant material. For this choice of alumina and garnet materials the expansion properties of both the body and the attached face-plate are well matched. However, this approach to the problem is complex, expensive, and requires specialist equipment for tube manufacture.

DISCLOSURE OF THE INVENTION

The invention is intended to provide a vacuum tight seal between glass and a face-plate of solid phosphor material. Since lead-glass may be used for the material of the tube body, conventional tube manufacture tooling, may with little, if any, modification, be utilised in the course of manufacture, and much of the technology required is already familiar.

In accordance with a first aspect of this invention there is provided a cathode ray tube having a body of glass material, and, a face-plate, at the end of the body, of solid phosphor material, wherein, there is provided between the body and the faceplate, a seal of malleable halide material.

The sealant material may be composed of a single halide, preferably, silver chloride. This preferred material has a melting point of 455° C., some 80° C. below the softening point of lead-glass. Being of malleable material, this seal can accommodate the shear stress produced by thermal cycling in a normal environment. The face-plate used may be of single-crystal material, even one exhibiting relatively high anisotropic expansion, for the malleable seal may accommodate this.

Alternatively, the sealant material may be composed of a compound halide, for example a halide compound, of eutectic composition, and in particular the eutectic of silver-lead chloride. This latter material has a melting point of 310° C., is malleable, and may be used where a lower temperature sealant is required.

In accordance with a second aspect of this invention there is provided a method of manufacturing a cathode ray tube, this method comprising the steps of:- interposing a ring of halide sealant material between abutting surfaces of a solids phosphor face-plate and a glass tube or intermediary glass housing; maintaining the whole in a vacuum and heating to a temperature at or above the melting point of the sealant material, whilst maintaining the face-plate and the glass inforced contact, until the sealant material starts to flow; and, cooling to allow the sealant material to solidify.

BRIEF INTRODUCTION OF THE DRAWINGS

In the accompanying drawings

DESCRIPTION OF THE EMBODIMENTS

Figure 1:
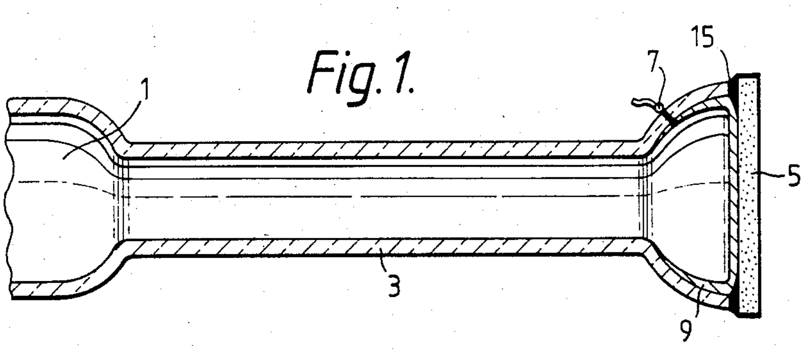
FIG. 1 is a cross-section drawing of a cathode ray tube having a solids phosphor face-plate.

Embodiments of the invention will now be described, by way of example only, and with reference to the accompanying drawings:

In FIG. 1 there is shown a cathode ray tube 1 having a lead-glass tube wall 3 with a solid phosphor face-plate 5 sealed to the tube wall 3 at the lower flared end of the cathode ray tube 1. An anode contact 7 is sealed into an aperture through the glass wall 3 at the flared end of the tube 1 and aluminium electrode materials 9 has been deposited over the rear face of the face-plate 5 and over the lower inside surface portion of the tube 1, to cover and make contact with the anode contact 7. A cathode gun and control optics (not shown) are mounted and sealed into the upper end of the tube 1, and a vacuum provided in the enclosed tube 1.

Figure 2:
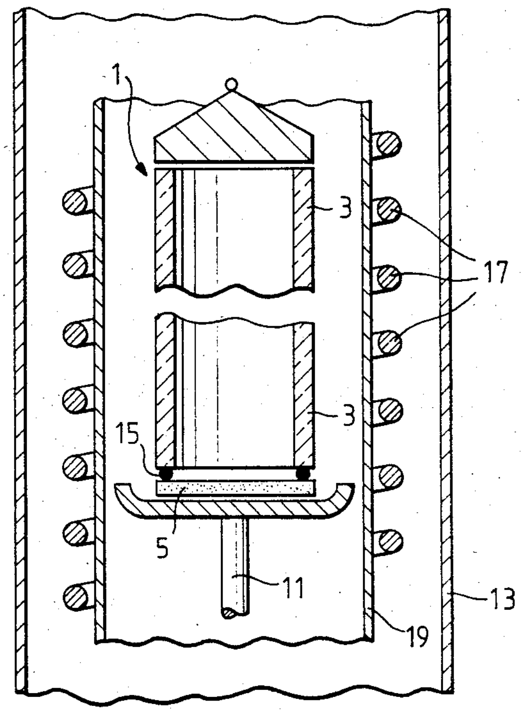
FIG. 2 is a schematic cross-section drawing of a cathode ray tube in course of construction; and, FIG. 3 is a schematic cross-section drawing of a cathode ray tube including a glass ceramic face-plate housing.

In FIG. 2, this tube 1 is shown during a stage of its construction. Here, the face-plate 5 is supported on a vertical pedestal 11 within a vacuum chamber 13. The lead-glass tube 3 is arranged to rest upon the surface of the face-plate 5 and is weighted at its upper end to increase the pressure of the tube upon the surface of the face-plate and to maintain the two in forced contact.

A ring of sealant material 15, cut from a rolled sheet of silver chloride, has been interposed between the glass tube 3 and the face-plate 5. The end surface of the glass tube 3 and the upper surface of the faceplate 5 have been polished to ensure a good seal.

The faceplate 5, shown in this example, has been cleaved from a stock of single crystal zinc tungstate material.

The tube 3 and faceplate 5 are surrounded by an electrical heater winding 17 and cylindrical liner 19. To effect the seal, the temperature is raised above the melting point (455° C.) of the sealant material and maintained until the silver chloride material starts to flow to the edges of the tube 3. The temperature is then slowly lowered and the sealant allow to solidify. This is then followed by anode deposition and cathode gun mounting stages. Subsequently the whole is annealed at approx 400° C. and the cathode ray tube 1 is vacuum sealed.

Typical dimensions for the above cathode ray tube constructin are given as follows:

| | |
|---|---|
| Tube & faceplate diameter: | 23 mm |
| Faceplate thickness: | 2 mm |
| Sealant ring thickness: | 200-500 μm |

Zinc tungstate emits at the blue end of the visible spectrum and is reasonably well suited therefore to photo-typesetting application. As single crystal material is used, the problems of particle scattering are obviated and clear definition can be obtained.

For tele-cine application, a broader spectral band response is desirable. Doped calcium borate single crystal faceplate material is preferred for this application.

Figure 3:
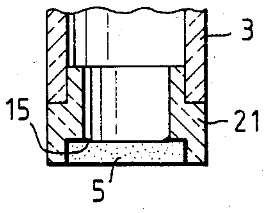

The silver chloride sealant material will also form a good seal with glass ceramic. In the alternative construction shown in FIG. 3, the faceplate 5 is sealed to the glass tube 3 using an intermediary housing 21 of machined glass ceramic. The glass tube 3 has been bonded to the ceramic housing 21 using a glass frit. (It is noted that the halide sealant could also be used in place of this glass frit). The ceramic housing 21 is sealed to the faceplate 5 using a ring of sealant as described above.

Single crystal faceplate cathode ray tubes however, do not appear to be wholly satisfactory for high intensity applications. A particular draw-back here is the low optical efficiency resulting from internal reflections within the crystal. As an alternative, a refractory solids faceplate of particulate phosphor material—eg hot pressed zinc yttrium silicate ($ZnY_2Si_2O_8$) can be used for these applications.

It is noted that the sealant material silver chloride has general application where a seal is required between glass and a solids phosphor. Some materials, however, may benefit by having a layer of aluminium, several hundred Angstroms thick, evaporated prior to sealing under vacuum.

For sealing materials at lower temperatures, eutectic lead-silver chloride (mpt 310° C.) could be used as an alternative sealant material. All seals of this nature exhibit a malleability at room temperature, preventing damaging shear forces being in-built.

I claim:

1. A cathode ray tube, comprising a body of glass material, an electron gun disposed at one end of said body, a faceplate of solid phosphor material disposed at the other end of said body, and a seal of malleable halide material disposed between said glass body and said faceplate.

2. A cathode ray tube, as claimed in claim 1 above, wherein the seal is of silver chloride material.

3. A cathode ray tube, as claimed in claim 1 above, wherein the seal is of silver-lead chloride eutectic material.

4. A cathode ray tube, as claimed in any one of the preceding claims, wherein the faceplate is of zinc tungstate single crystal material.

5. A cathode ray tube, as claimed in any one of the preceding claims 1 to 3, wherein the faceplate is of doped calcium borate single crystal material.

6. A cathode ray tube as claimed in claim 1 wherein the faceplate is of refractory solids particulate phosphor material.

7. A cathode ray tube as claimed in claim 6 wherein the faceplate is of hot-pressed zinc yttrium silicate material.

8. A cathode ray tube as in claim 1, further comprising a thin bonding layer of aluminum between said seal and at least one of said body and said faceplate.

9. a cathode ray tube, comprising:

a glass envelope;

an electron gun fixed to one end of said envelope;

a glass ceramic housing bonded to said envelope at a position remote from said electron gun, said housing comprising a recess;

a faceplate of solid phosphor material arranged in said recess in said housing; and a seal of malleable halide material between said recess and said faceplate;

whereby electrons from said gun can be directed onto said faceplate and cause said faceplate to emit light.

10. A cathode ray tube as in claim 1, wherein said seal of malleable halide material seals said glass body directly to said faceplate.

11. A cathode ray tube as in claim 9, wherein said seal of malleable halide material seals said housing directly to said faceplate.

12. A cathode ray tube as in claim 9, further comprising a thin bonding layer between said seal and at least one of said body and said face plate.

* * * * *